US006276518B1

United States Patent
Wierman

(12) United States Patent
(10) Patent No.: US 6,276,518 B1
(45) Date of Patent: Aug. 21, 2001

(54) VIBRATORY DRIVE FOR A VIBRATORY CONVEYOR

(75) Inventor: Michael J. Wierman, Walla Walla, WA (US)

(73) Assignee: Key Technology, Inc., Walla Walla, WA (US)

( * ) Notice: Subject to any disclaimer, the term of this patent is extended or adjusted under 35 U.S.C. 154(b) by 0 days.

(21) Appl. No.: 09/385,700

(22) Filed: Aug. 30, 1999

(51) Int. Cl.⁷ ................................................ B65G 27/00
(52) U.S. Cl. ....................... 198/752.1; 198/750.1; 198/770
(58) Field of Search ................ 198/750.1, 752.1, 198/753, 754, 755, 766, 770

(56) References Cited

U.S. PATENT DOCUMENTS

| 3,053,379 | 9/1962 | Roder et al. . |
| 5,178,259 | * 1/1993 | Musschoot ........................ 198/753 X |
| 5,584,375 | 12/1996 | Burgess, Jr. et al. . |
| 5,794,757 | * 8/1998 | Svejkovsky et al. ......... 198/750.8 X |
| 5,850,906 | * 11/2000 | Dean ............................. 198/750.8 X |
| 5,934,446 | * 8/1999 | Thomson ............................. 198/753 |
| 5,938,001 | 8/1999 | Turcheck, Jr. et al. . |
| 6,145,652 | * 11/2000 | Dean ................................. 198/753 X |

* cited by examiner

Primary Examiner—Christopher P. Ellis
Assistant Examiner—Gene O. Crawford
(74) Attorney, Agent, or Firm—Wells, St. John, Roberts, Gregory & Matkin, P.S.

(57) ABSTRACT

A vibratory conveyor apparatus is described and which includes a conveyor bed, a frame mounted on the conveyor bed and which facilitates the reciprocal motion of the conveyor bed, and a drive assembly borne by the conveyor bed and which imparts reciprocal motion to same. The vibratory drive causes the conveyor bed to reciprocate at different velocities.

7 Claims, 8 Drawing Sheets

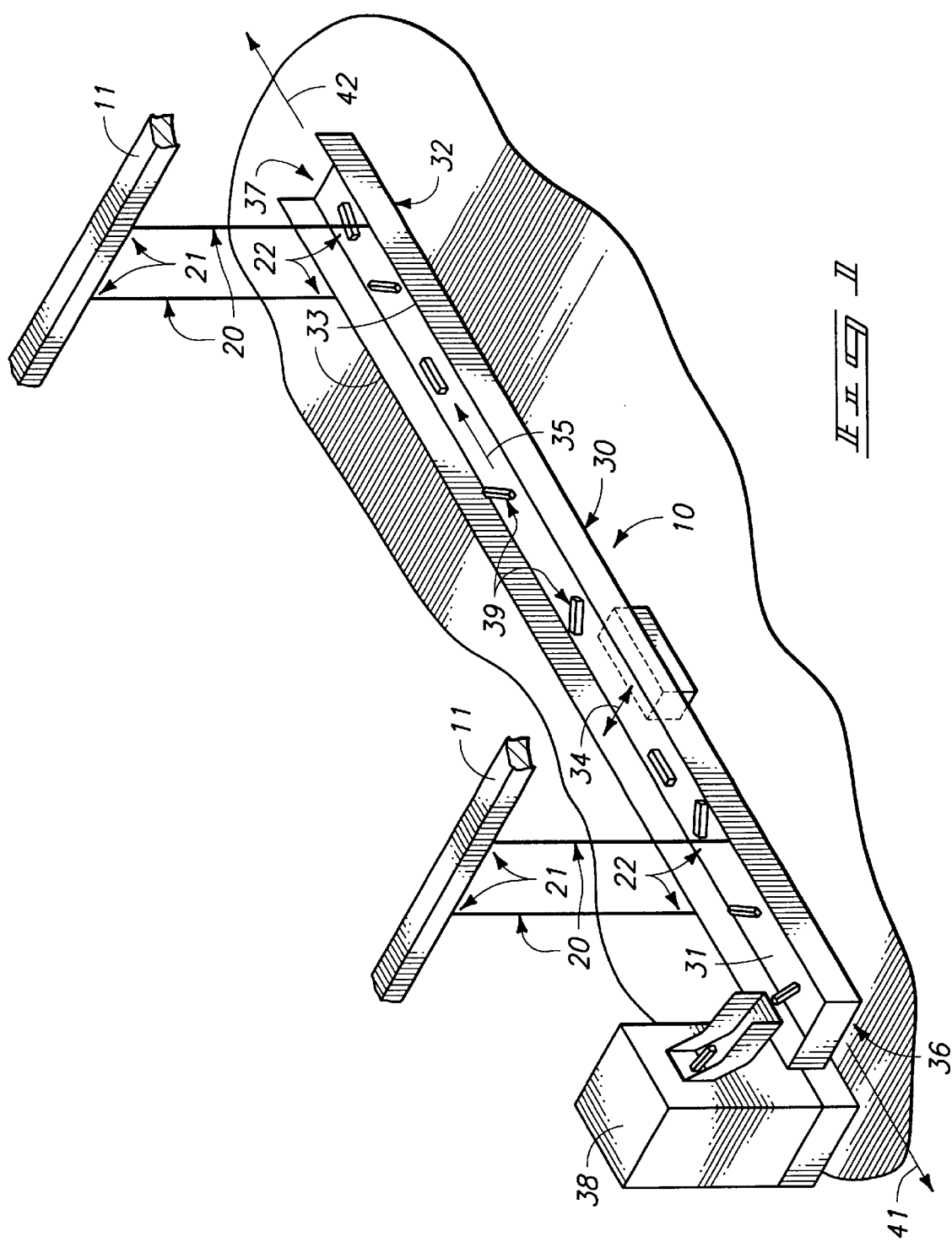

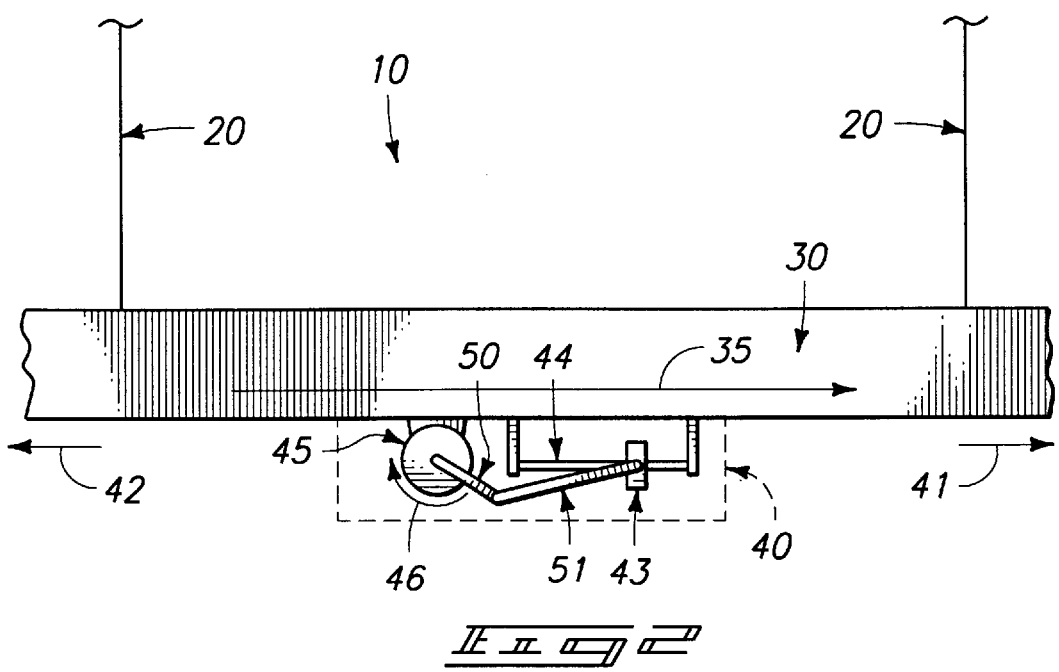
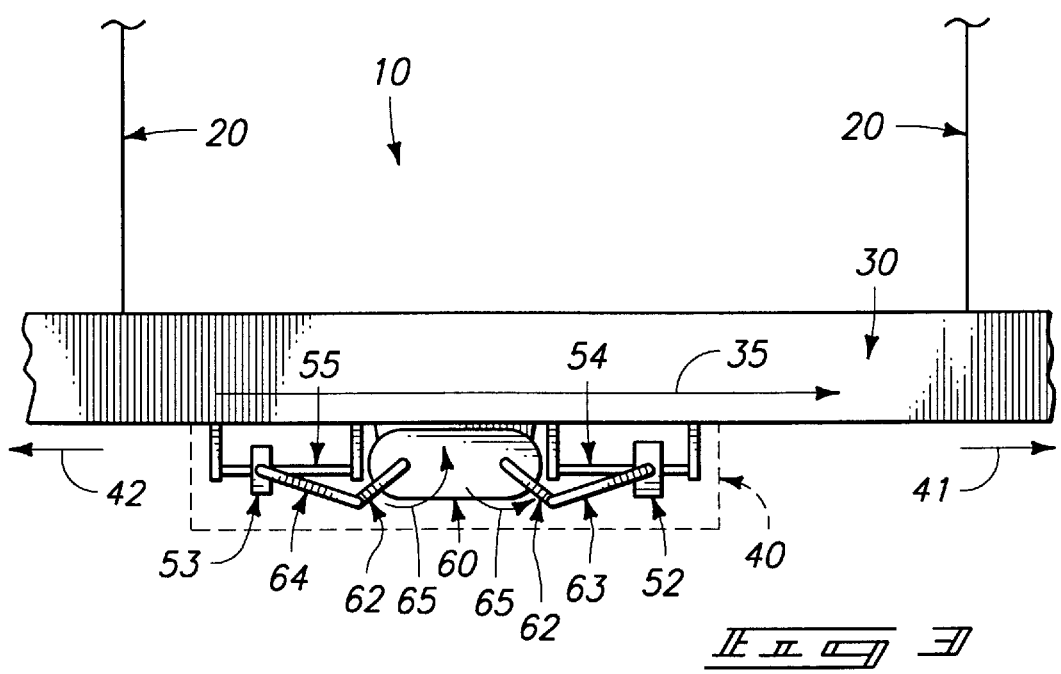

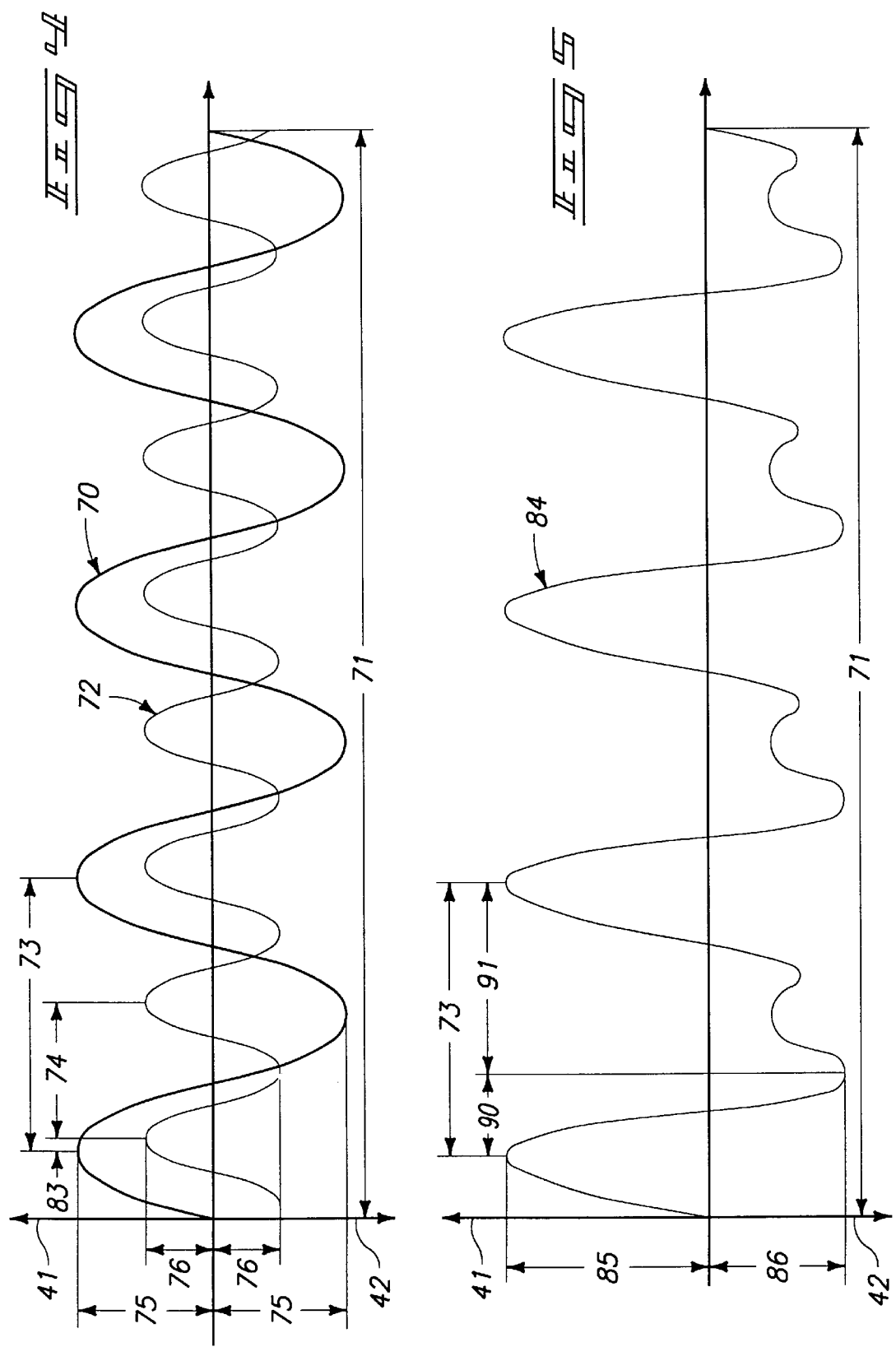

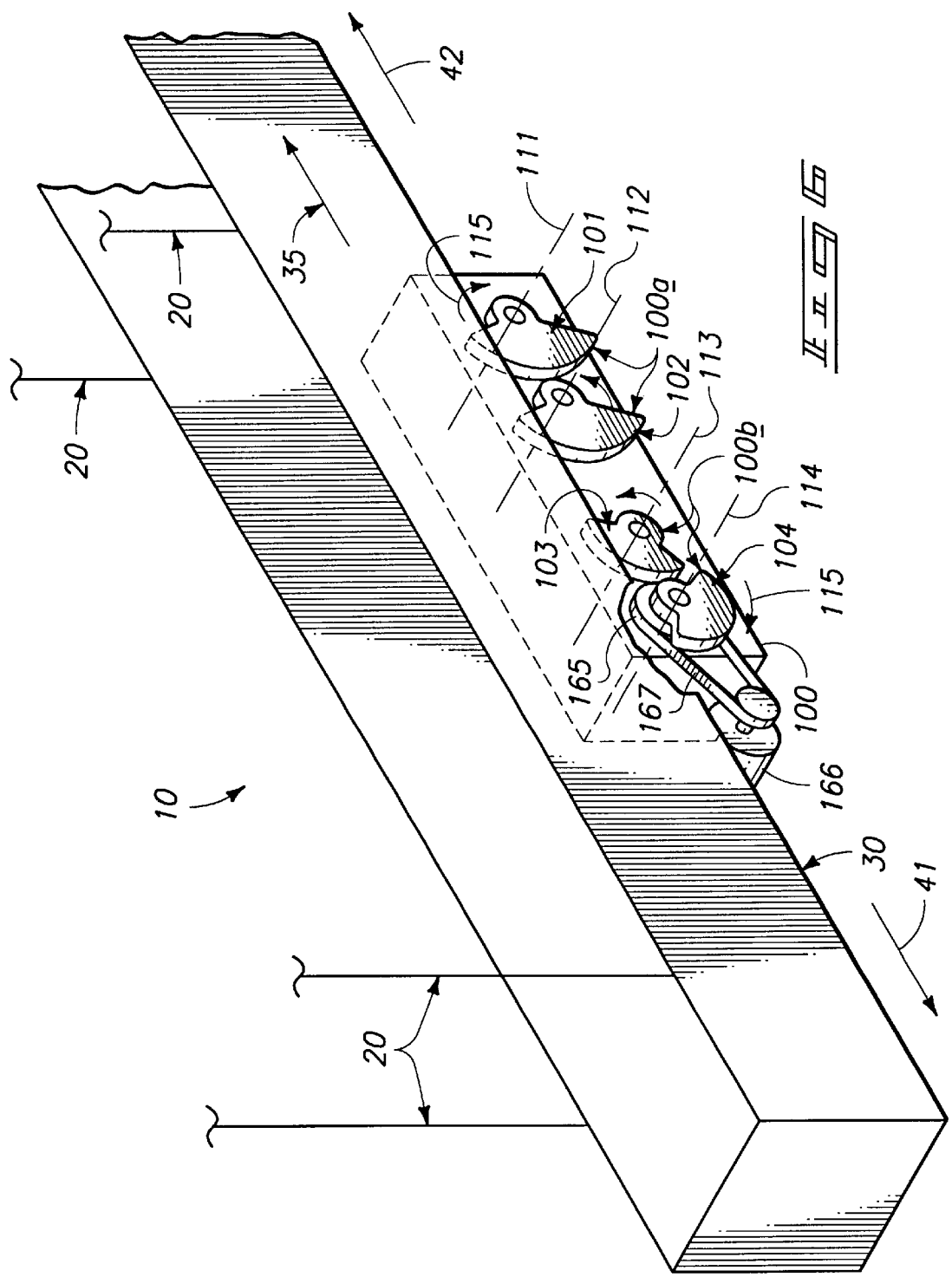

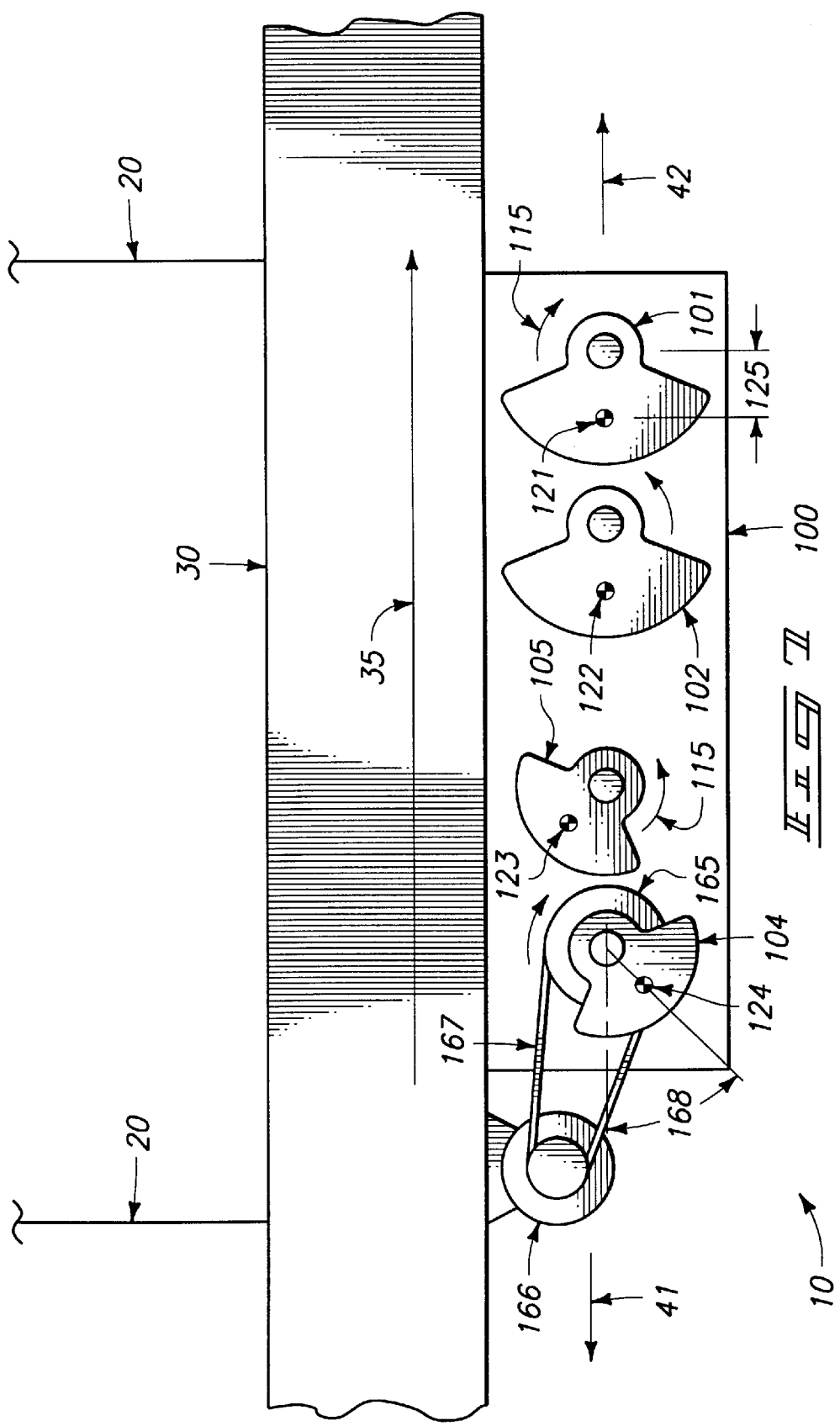

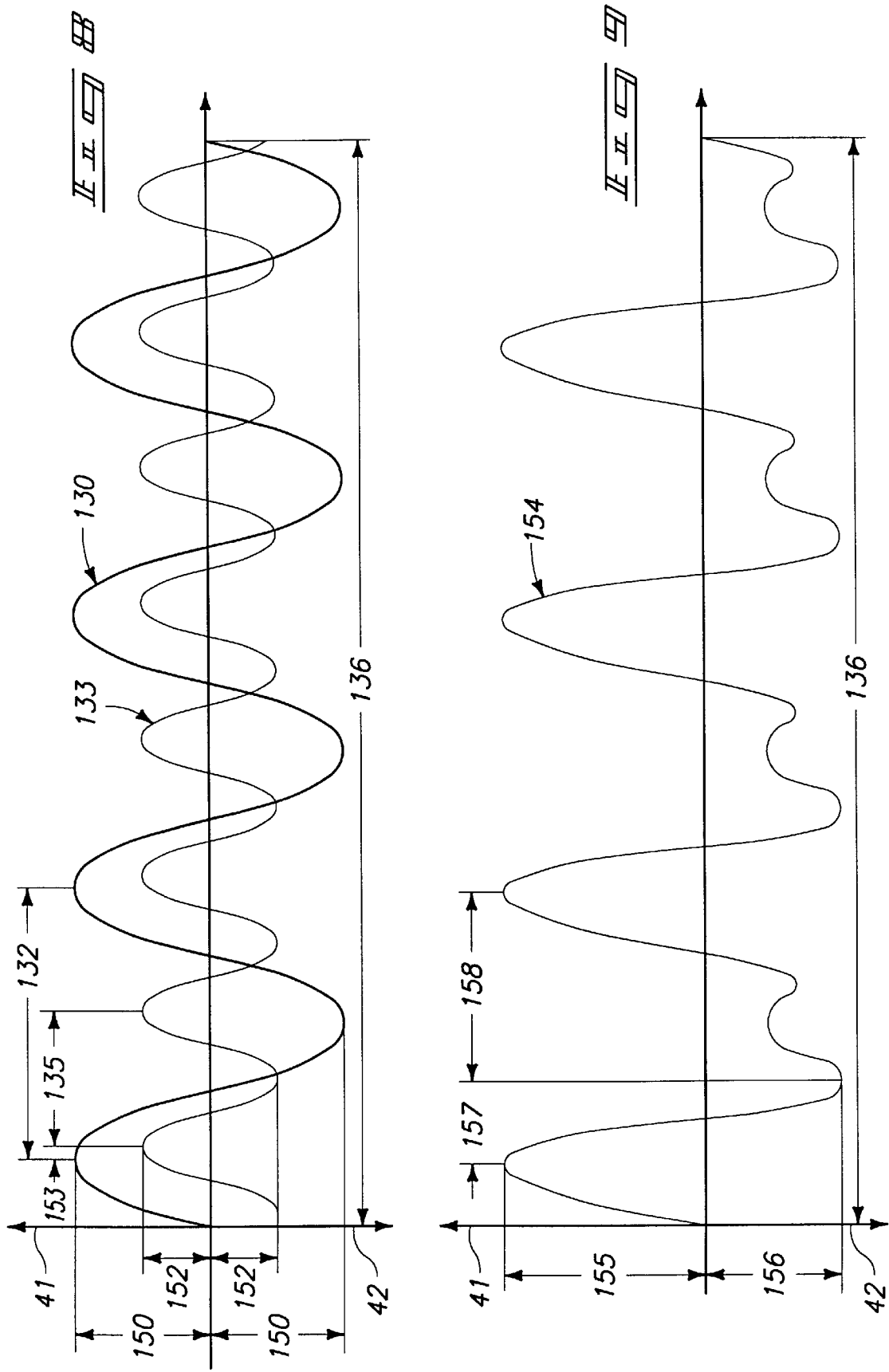

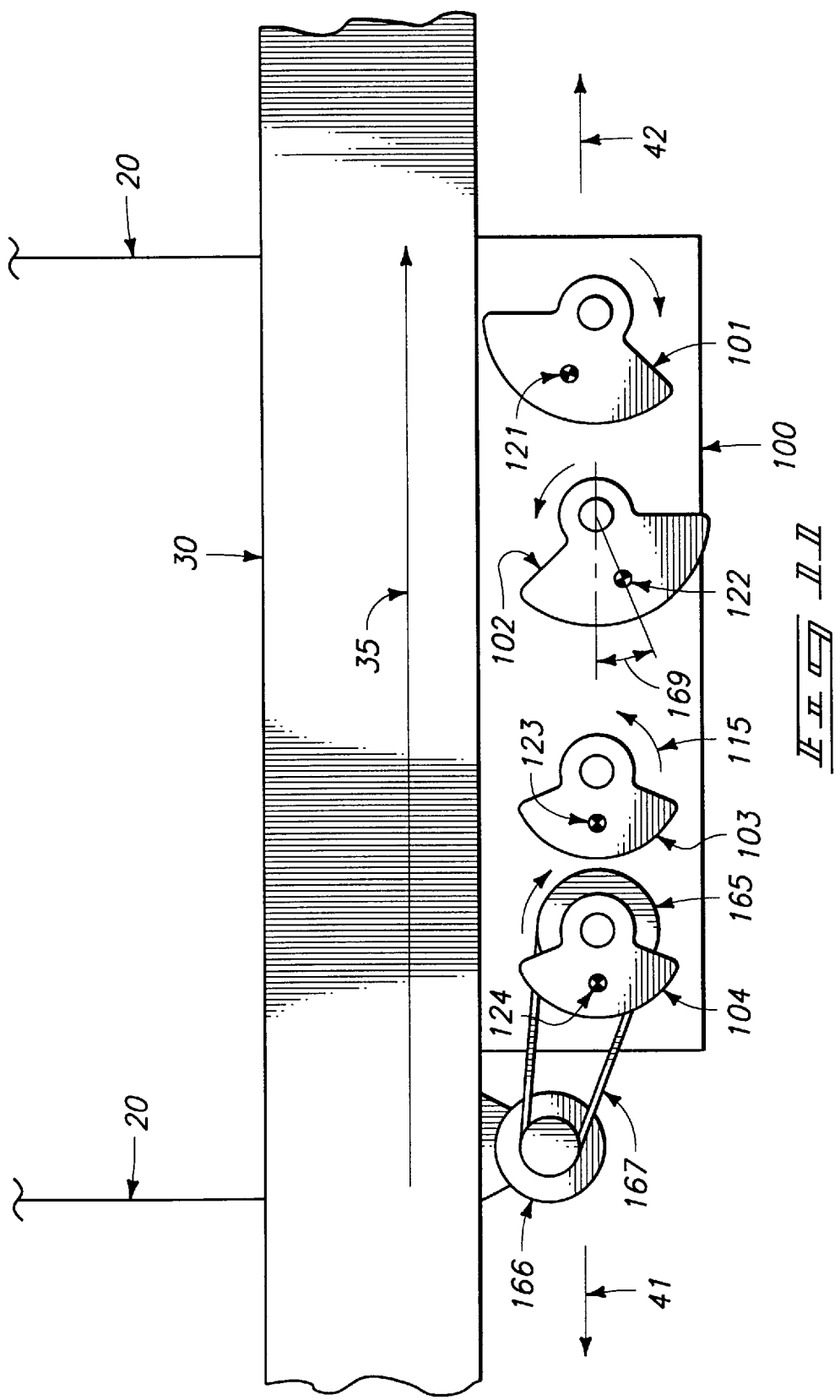

VIBRATORY DRIVE FOR A VIBRATORY CONVEYOR

TECHNICAL FIELD

The present invention relates to a vibratory conveyor and more specifically to an improved vibratory drive for use with same.

BACKGROUND OF THE INVENTION

Vibratory conveying devices are known in the art. U.S. Pat. No. 4,313,535, which is incorporated by reference herein, teaches a typical vibratory conveyor of the excited frame type. Vibratory conveyors are generally used for conveying particulate product in a commercial environment. Generally speaking, vibratory conveyors consist of a conveying member, or bed, for supporting the product as the product is conveyed along a given path of travel. The conveyor bed is generally in the form of a unitary elongated channel, or trough, for containing or directing the product. In the food processing industry, the unitary construction of the vibratory conveyor bed is considered advantageous because it is viewed as more sanitary than conveyors which utilize endless belts, rollers, or other multi-piece conveying members.

In the conventional design of an excited frame vibratory conveyor, the conveyor bed is supported by and attached to the upper ends of a series of parallel leaf springs. The lower ends of the leaf springs, in turn, are attached to a frame which rests on a floor or other supporting surface. The leaf springs extend upward from the frame and are generally inclined toward the intake end of the conveyor bed, which is generally horizontal and parallel to the floor.

Attached to the frame in a conventional excited frame vibratory conveyor is a drive assembly which produces a vibrating force which imparts a reciprocal motion to the conveyor bed. The vibrating force is usually produced by the rotation of a pair of counter-rotating eccentric weights, which are sub-components of the drive assembly. Each of the eccentric weights has an axis of rotation and a center of mass which is eccentric to the axis of rotation. The distance from the axis of rotation to the center of mass is generally referred to as the eccentricity.

As each weight is rotated about its axis, the eccentric configuration of the center of mass causes a centrifugal force to be produced relative to the axis. The magnitude of the centrifugal force is directly proportional to both the mass of the rotating weight and the distance from the axis of rotation to the center of mass of the weight. The magnitude of the centrifugal force is also proportional to the square of the angular velocity of the weight as it is rotated about the axis. Thus, the equation for the centrifugal force can be written as follows: $F_c = mr(\omega^2)$, where "$F_c$" is the centrifugal force, "m" is the mass of the weight, "r" is the distance from the axis to the center of mass of the weight, and "$\omega$" is the angular velocity of the weight about the axis. For weights with fixed masses and fixed centers of mass, the terms "m" and "r" combine to form a constant. Within the industry, this constant has been referred to as the "eccentricity times the weight," or the "ERWT" value. With this in mind, the equation for the centrifugal force can also be written as follows: $F_c = ERWT(\omega^2)$. Thus, the centrifugal force produced by a rotating eccentric weight is proportional to the ERWT value of the weight and to the square of its angular velocity.

If two eccentric weights of substantially similar ERWT values are rotated about parallel axes in opposing directions and are properly synchronized, the centrifugal forces produced by each weight will combine to form a substantially linear sinusoidal vibrating force. To illustrate, consider two such weights in a standard three-coordinate axis system. First, it is assumed that both axes are parallel to the x-axis and are in the x-y plane and are supported by a common support. Next, a reference line on each weight is defined as being perpendicular to the respective axis and extending from the axis to the center of mass of the respective eccentric weight. Also, it is assumed that the weights rotate in opposite directions and at the same angular velocity. Furthermore, as the weights rotate, the reference line on each weight is parallel to, and in the positive region of, the z-axis at the same point in time. Thus, as the weights rotate, they produce centrifugal forces in the y-z plane.

However, because of the rotational synchronization of the weights, the forces parallel to the y-axis will be canceled out with respect to the common support of the weights, since any force produced in the positive y-direction by one weight is counteracted by an equal force produced by the other weight in the negative y-direction. Conversely, the centrifugal forces in the z-direction are additive, since both weights produce a force in the positive z-direction at the same time, and vice versa for the negative z-direction. Thus, the centrifugal forces of the weights will combine to produce a linear, sinusoidal, vibrating force in the z-direction.

The equation for this sinusoidal force produced by a pair of synchronized, counter-rotating eccentric weights can be written as follows: $F_s = [F_{c1}\sin(\alpha)] + [F_{c2}\sin(\alpha)]$, where "$F_s$" is the sinusoidal force, "$F_{c1}$" is the centrifugal force produced by the first weight, is "$F_{c2}$" is the centrifugal force produced by the second weight, and "$\alpha$" is the angle of the weight from a position where both centrifugal forces oppose each other and are parallel to the y-axis. If the ERWT values of both weights are the same, then $F_{c1} = F_{c2}$, and the equation can be written: $F_s = 2F_c\sin(\alpha)$, where "$F_c$" is the centrifugal force produced by each weight. Substituting the equation above for $F_c$, the equation becomes: $F_s = 2mr(\omega^2)\sin(\alpha)$, or $F_2 = 2(ERWT)(\omega^2)\sin(\alpha)$, where the ERWT value for each weight is the same.

In conventional excited frame vibratory conveyors, as discussed above, the direction of the vibrating force produced by the drive assembly is generally oriented such that it is directed along a line which passes through the center of mass of the conveyor bed, and the underlying frame. The resulting motion of the conveyor bed is then generally upward and toward the exhaust end of the conveyor in one direction, and downward and toward the intake end of the conveyor in the opposite direction. This reciprocal motion of the conveyor bed tends to "bounce" the particulate product along the conveyor bed from the intake end to the exhaust end.

While excited frame vibratory conveyors of conventional design have been operated with varying degrees of success, there have been shortcomings which have detracted from their usefulness. For example, if delicate products, or products with coatings, are conveyed on a conventional excited frame vibratory conveyor, the delicate products can be damaged, and coatings can separate from the products intended to be coated. This problem is due, in large part, to the repeated impact or bouncing of the product against the conveyor bed as the product travels to the distal end thereof.

Therefore it has long been known that it would be desirable to provide a vibratory conveyor device which achieves the benefits to be derived from similar prior art devices, but which avoids the detriments individually associated therefrom.

BRIEF DESCRIPTION OF THE DRAWINGS

Preferred embodiments of the invention are described below with reference to the following accompanying drawings.

FIG. 1 is a perspective view of a first form of a vibratory conveyor apparatus incorporating the present invention.

FIG. 2 is a side elevation of the vibratory conveyor apparatus shown in FIG. 1.

FIG. 3 is a side elevation of the first form of the invention and showing an alternative embodiment thereof.

FIG. 4 is a graphic representation of the sinusoidal forces produced by the drive assembly shown in FIG. 3.

FIG. 5 is a graphic representation of the oscillating force resulting from the combined sinusoidal forces shown in FIG. 4.

FIG. 6 is a partial, perspective view of an alternative form of the vibratory conveyor apparatus and illustrating a second form of the vibratory drive utilized with same.

FIG. 7 is a partial, side elevation view of the drive assembly shown in FIG. 6 and showing first and second positions of the eccentric weights.

FIG. 8 is a graphic representation of the sinusoidal forces produced by the rotating eccentric weights of the vibratory drive assembly shown in FIG. 6 and FIG. 7.

FIG. 9 is a graphic representation of the oscillating force resulting from the combined sinusoidal forces shown in FIG. 8.

FIG. 11 is a side elevation of the drive assembly shown in FIG. 6 and showing third and fourth positions of the eccentric weights.

DETAILED DESCRIPTION OF THE PREFERRED EMBODIMENTS

Figure 10:
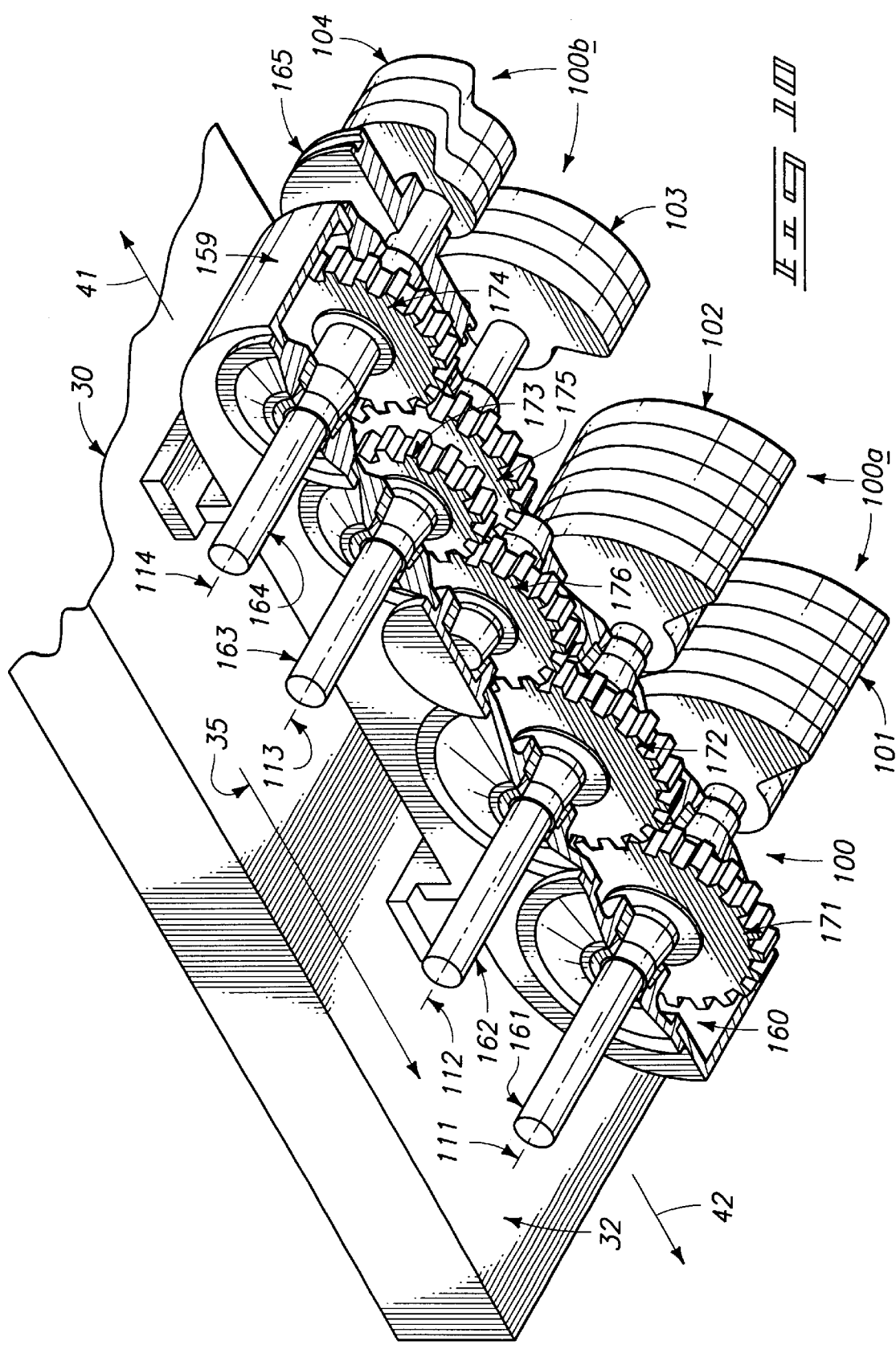
FIG. 10 is fragmentary, bottom plan view of the drive assembly shown in FIG. 6 and FIG. 7 with some supporting surfaces removed to show the structure thereunder.

This disclosure of the invention is submitted in furtherance of the constitutional purposes of the U.S. Patent Laws "to promote the progress of science and useful arts" (Article 1, Section 8).

The apparatus of the subject invention is best understood by a study of FIG. 1 and is generally indicated by the numeral 10. As shown in FIG. 1, the apparatus 10 is suspended from an overhead structure or framework 11 which may be part of a building, or which may form a part of a frame which rests on an underlying supporting surface (not shown). A plurality of support members, such as cables or other rigid members 20, each having an upper end 21 and a lower end 22, are affixed to the structure 11 at the upper ends 21. The members 20 will preferably have substantially equal lengths. The lower end 22 of each of the members 20 is attached to a conveyor bed 30. The member 20, together with the structure 11, act as a supporting frame for the conveyor bed 30. This frame allows the conveyor bed 30 to reciprocate in a substantially horizontal plane.

Still referring to FIG. 1, the conveyor bed 30 generally has a top surface 31, bottom surface 32, and two side walls 33 which extend normally upwardly from the top surface 32. The top surface 31 and the side walls 33 of the conveyor bed 30 define a channel 34 for supporting the product 39 for movement along a given path indicated by the numeral 35. The product 39 is introduced onto the conveyor bed 30 from a processing machine 38 or other such upstream equipment at the intake end 36. The product 39 rests on the top surface 31 and is contained thereon by the side walls 33. Reciprocal motion of the conveyor bed 30 moves the product 39 along, the given path 35 on the top surface It of the conveyor bed 30 to the exhaust end 37.

As shown in FIG. 1, a first form of the drive assembly 40 is borne by the conveyor bed 30. The first form of the drive assembly 40 imparts reciprocal vibratory motion to the conveyor bed 30. The drive assembly causes the conveyor bed 30 to reciprocate alternatively in a first direction 41 and then in a second direction 42 which is opposite to the first direction. As will be recognized, the first and second directions 41, 42 are substantially parallel to the conveyor bed 30 and substantially coaxial relative to the given path 35. The first direction 41 is generally in the direction of the intake end 36 of the conveyor apparatus 10, and the second direction 42 is generally in the direction of the exhaust end 37 of the conveyor bed 30. As the conveyor bed 30 reciprocates, it generally has a maximum velocity in each of the first and second directions 41, 42. During operation of the conveyor apparatus 10, the maximum velocity of the conveyor bed 30 in the first direction 41 is greater than the maximum velocity of the conveyor bed 30 in the second direction 42. The nature of this reciprocal motion of the conveyor bed 30 has the effect of optimizing the product movement along the conveyor bed 30 from the intake end 41 to the exhaust end 42 with minimal bouncing of the product 43 and with increased speed.

Still referring to FIGS. 1, 2 and 3, the first form of the drive assembly 40 creates predetermined vibratory forces by utilizing movable weights which travel along predetermined paths. This first form of the present invention contemplates using at least one reciprocating weight indicated by the numeral 43 and which reciprocates along a slide or track 44 which is oriented in substantially parallel spaced relation relative to the conveyor bed 30. The reciprocating weight 43 is propelled by a suitable motor 45, or other similar driving device. The motor 45 turns a bellcrank 50 which rotates in a direction indicated by the numeral 46. The bellcrank 50 is connected in force transmitting relation to an arm 51 which in turn, is coupled to the reciprocating weight 43. As will be seen, the rotation of the bellcrank 50 is translated into a reciprocating motion of the weight 43. The reciprocating motion of the weight 43 on the slide or track 44 creates a reciprocating force which imparts a corresponding reciprocating motion to the conveyor bed 30. As noted above, the reciprocating motion of the conveyor bed 30 is characterized by movement in a first direction 41, and an opposite second direction 42. Motor 45 turns at a varying speed such that the maximum velocity of the conveyor bed 30 in the first direction 41 is higher than the maximum velocity of the conveyor bed 30 in the second direction 42.

As best illustrated in FIG. 3, a second form of the present drive assembly 40 contemplates using a pair of reciprocating weights 52 and 53 which reciprocate along a pair of slides or tracks 54 and 55 which are mounted in spaced, substantially parallel relation relative to the conveyor bed 30. The reciprocating weights 52 and 53 are propelled by a motor 60, or other suitable driving device. The motor 60 is connected to a pair of bellcranks 61 and 62. Each of the bellcranks 61 and 62 are individually connected in force transmitting relation to an arm 63 and 64, respectively. Each of the arms 63 and 64 are individually coupled to one of the reciprocating weights 52 and 53. As should be understood, the bellcrank 62 is turned by the motor 60 at substantially twice the angular velocity of the bellcrank 61. The respective bellcranks 61 and 62 turn in the directions as shown by the lines labeled 65. It should be understood that the bellcranks 61, 62 may turn in directions opposite to those indicated, provided the relative angular relationship is maintained. As illustrated, the mass of the reciprocating weight 52 is greater than the mass of the reciprocating weight 53. Further, the maximum force produced by the reciprocating weight 52 is about the same as to about four (4) times greater than the maximum force produced by the reciprocating weight 53.

Referring still to FIG. 3, the present invention incorporates a timing offset feature wherein the maximum force produced by the weight 52 in the first direction 41 precedes a maximum force produced by the weight 53 in the first direction 41 by a given time interval. The given time interval is equal to about 1/36 to about 1/12 of the time for one revolution of the bellcrank 61. The timing offset feature of the invention is adjustable by varying the angular relationship between the two bellcranks 61, 62. The adjustment feature of the timing offset provides an advantage inasmuch as it has been discovered that varying the timing offset has the effect of changing the conveying speeds of different types of products. Thus, the present invention may be readily adjusted with respect to the conveying speed which it may provide.

The nature of the forces produced by the reciprocating weights 52 and 53 may be best understood by a study of FIGS. 3 and 4. The force produced by reciprocating weight 52 is generally sinusoidal and is graphically represented by the line indicated by the numeral 70 over a given or predetermined span of time 71. The force produced by the reciprocating weight 53 is also generally sinusoidal and is graphically represented by the line indicated by the numeral 72 over the same span of time 71. The force produced by the reciprocating weight 52 has a period indicated by the numeral 73. Similarly, the period of the force produced by reciprocating weight 53 is indicated by the line labeled 74. Because the bellcrank 62 turns at substantially twice the speed of bellcrank 61, the frequency of the force produced by bellcrank 62 is substantially twice the frequency of the force produced by bellcrank 61. The maximum force produced by the reciprocating weight 52 is indicated by the numeral 75. Likewise, the maximum force produced by the reciprocating weight 53 is indicated by the numeral 76. These maximum forces 75 and 76 occur in both the first and second directions 41 and 42. The timing offset feature mentioned above is graphically illustrated by the time interval between the two maximum forces in the first direction which is indicated by the numeral 83.

Referring now to FIGS. 3–5, the forces shown in FIG. 4 created by the reciprocating weights 52 and 53 combine to produce a force which is graphically represented by the numeral 84. Force 84 oscillates between a maximum force 85 in the first direction 41, and a maximum force 86 in the second direction 42. As shown in FIG. 5, the oscillating force 84 is asymmetrical. More specifically, the maximum force 85 in the first direction 41 is greater than the maximum force 86 in the second direction 42. The time interval which elapses from the maximum force 85 in the first direction 41, to the maximum force 86 in the second direction 42 is indicated by the numeral 90. The time interval which elapses from the maximum force in the second direction 86 to the maximum force in the first direction 85 is indicated by the numeral 91. The time interval 91 is greater than the time interval 90. The asymmetrical nature of the oscillating force 84 causes the conveyor bed 30 to have a higher velocity in the first direction 41 than in the second direction 42. This, in turn causes the product 39 to move along the given path 35 toward the exhaust end of the conveyor 30.

As noted, the reciprocal vibratory motion generated by the first form of the drive assembly 40 is produced by at least one linearly moveable weight. As best shown in FIG. 6, the second form of the drive assembly 100 most preferably has first and second pairs, 100A and 100B, of rotatable eccentric weights which rotate synchronously, one pair with the other. The first pair of eccentric weights 100A is made up of a first eccentric weight 101, and a second eccentric weight 102. The second pair of eccentric weights 100B is made up of a third eccentric weight 103 and a fourth eccentric weight 104. The first eccentric weight 101 is supported by the second form of the drive assembly 100 for rotational movement about a first axis of rotation 111. The first axis of rotation 111 is substantially transverse to the given path of travel 35. Likewise, the second, third, and fourth eccentric weights 102, 103, and 104 respectively, are supported by the drive assembly 100 for rotational movement about second, third, and fourth axes of rotation, 112, 113, and 114, respectively.

As shown in FIG. 7, each eccentric weight 101, 102, 103, and 104, respectively, have a center of mass indicated by the numerals 121, 122, 123, and 124. As discussed above, the ERWT value for an eccentric weight is equal to the mass of the weight multiplied by the distance between the center of mass of the eccentric weight to the axis of rotation of the eccentric weight. This distance typically illustrated on the first weight and is indicated by the numeral 125. Each individual weight 101, 102, 103, and 104 has an ERWT value such that the ERWT value of each of the first pair of weights 101, 102 is substantially identical, one to the other, and the ERWT value of each of the second pair of weights 103, 104 is substantially identical, one to the other. Stated in another way, the ERWT value of the second eccentric weight 102 is substantially equal to the ERWT value of the first eccentric weight 101. Likewise, the ERWT value of the fourth eccentric weight 104 is substantially equal to the ERWT value of the third eccentric weight 103. Further, the ERWT values of each of the first pair of eccentric weights 101, 102 is about four (4) to about sixteen (16) times greater than the ERWT values of each of the second pair of eccentric weights 103, 104.

As earlier discussed with respect to the first form of the invention, it should be understood that if a pair of eccentric weights of substantially similar ERWT values are rotated and properly synchronized, the result will be a sinusoidal force which will cause reciprocal motion. Referring now to FIG. 6 and FIG. 7, the vibratory drive 100 includes a first pair of rotatable eccentric weights 101 and 102 which synchronously counter-rotate, one with the other, at substantially similar speeds of rotation. The vibratory drive 100 also includes a second pair of is rotatable eccentric weights 103 and 104 which synchronously counter-rotate, one with the other, at substantially similar speeds of rotation. However, the speed of rotation of the second pair of rotatable eccentric weights 103 and 104 is substantially twice the speed of rotation of the first pair of rotatable eccentric weights 101, 102. As shown, the eccentric weights 101, 102, 103, and 104 rotate in directions indicated by the numeral 115. It should be understood that the weights 101, 102, 103, and 104 may rotate in directions opposite to those shown, provided the relative rotational and angular relationships are maintained.

The sinusoidal forces produced by the rotating eccentric weights 101, 102, 103, and 104 may be best understood by a study of FIGS. 7 and 8. As mentioned above, the vibratory drive 100 which is borne by the conveyor bed 30 imparts reciprocal vibratory motion to same. In the present embodiment of the invention, the vibratory drive 100 has a first pair 100A of rotatable eccentric weights 101 and 102 which individually have similar ERWT values and which counter-rotate, one relative to the other, at a given speed to produce a first sinusoidal force, indicated by the numeral 130 over a span of time 136. This force is characterized by a given period 132. Further, the second pair 100B of rotatable eccentric weights 103, 104 which have individually similar ERWT values, counter-rotate, one with the other, at substantially twice the given speed of the first weights 101, 102 to produce a second force, indicated by the numeral 133 over the span of time 136, and which is characterized by a second period 135.

Now referring to FIG. 8, the first and second forces produced by the first 101 and 102 and second 103 and 104 pairs of rotating eccentric weights are graphically represented by numerals 130 and 133 respectively. The first and second forces 130 and 133 respectively, are produced in a first direction 41 and an opposite second direction 42. These first and second directions 41 and 42 are substantially parallel to the given path of travel 35. Each sinusoidal force 130 and 133 has a maximum value which occurs in each of the first and second directions 41 and 42. The maximum value of the first force 130 is indicated by the numeral 150. The maximum value 150 of the first force 130 has substantially the same amplitude in each of the first and second directions 41 and 42. Likewise, the maximum value of the second force 133 is indicated by numeral 152. Similarly, the maximum value 152 of force 133 has substantially the same amplitude in each of the first and second directions 41 and 42.

As best appreciated by a study of FIG. 1, the conveyor bed 30 has an intake end generally shown by the numeral 36 and an exhaust end generally shown by the numeral 37. Referring now to FIG. 7, FIG. 8, and FIG. 9, the first direction 41 is in the direction of the intake end 36 and the second direction 42 is in the direction of the exhaust end 37.

The drive assembly 100 having the rotatable eccentric weights 101, 102, 103, and 104 incorporates a timing offset feature similar to that earlier described. This timing offset feature can best be understood by an examination of FIG. 8, which shows the maximum value of the force 150 which is produced by the first pair of weights 101, 102 in the first direction 41. This maximum value 150 occurs at the beginning of a given time interval 153. The maximum value 152 produced by the second pair of weights 103 and 104 in the first direction 41 occurs at the end of the same time interval 153. The given time interval 153 is about $\frac{1}{36}$ to about $\frac{1}{12}$ of the period 132 of the first force 130 which is produced by the first pair of rotatable eccentric weights 101 and 102. As earlier discussed, the time interval 153 is adjustable to maximize the conveying speed of various products moved by the conveyor bed 30.

Referring now to FIGS. 6, 8, and 9, the sinusoidal forces 130 and 133 created by the eccentric weights 101, 102, 103, and 104, combine to produce a force which is graphically represented in FIG. 9 by the line labeled 154. Force 154 oscillates between a maximum force 155 in the first direction 41, and a maximum force 156 in the second direction 42. As shown in FIG. 9, the oscillating force 154 is asymmetrical. More specifically, the maximum force 155 is greater than the maximum force 156. The time interval which elapses from the maximum force 155 to the maximum force 156 is indicated by the numeral 157. Likewise, the time interval which elapses from the maximum force 156 to the maximum force 155 is indicated by the numeral 158. The time interval 158 is greater than the time interval 157. As earlier discussed, the asymmetrical nature of the oscillating force 154 causes the conveyor bed 30 to have a higher velocity in the first direction 41 than in the second direction 42. This, in turn, causes the product 39 to move along the given path 35 toward the exhaust end of the conveyor bed 30.

A more detailed view of the drive assembly 100 is shown in FIG. 10, where it can be seen that the drive assembly 100 consists of a gearbox casing 159 defining a sealable cavity 160, and which is mounted on conveyor bed 30. A first shaft 161 is positioned substantially transversely relative to the given path of travel 35 and is supported by the casing 159 for rotational movement therewithin. Further, a second shaft 162, which is positioned in spaced, substantially parallel relation relative to the first shaft 161, is supported by the casing 159 for rotational movement. A plane is defined between the first and second shafts 161 and 162. This plane is substantially parallel to the given path of travel 35. A third shaft 163, is positioned in spaced, substantially parallel relation relative to, and also in substantially coplanar relation with, the first and second shafts 161, 162. This shaft is supported by the casing 159 for rotational movement. The second shaft 162 lies between the first shaft 161 and the third shaft 163. A fourth shaft 164 is positioned in spaced, substantially parallel relation relative to, and is substantially coplanar with, the first, second, and third shafts 161, 162, and 163, respectively. It is also supported by the casing 159 for rotational movement. The third shaft 163 lies between the second shaft 162 and the fourth shaft 164.

As further shown in FIG. 10, a pulley or toothed sprocket 165 is mounted concentrically on the fourth shaft 164. As best seen in FIG. 6, a motor 166 is mounted on the conveyor bed 30, adjacent to the drive assembly 100. An endless drive belt or chain 167 is connected between the motor 166 and the pulley or toothed sprocket 165. As illustrated, the endless drivebelt or chain 167 allows the motor 166 to drive the pulley or toothed sprocket 165, which in turn, drives the fourth shaft 164.

As further shown in FIG. 10, a first gear 171 is located within the cavity 160. The first gear has a first pitch radius and is mounted concentrically on the first shaft 161 and is operable for rotational movement therewith. A second gear 172 is also located within the cavity 160. The second gear has a second pitch radius which is substantially equal to the first pitch radius and is further mounted concentrically on the second shaft 162 and is operable for rotational movement therewith. As seen in FIG. 10, the first and second gears 171 and 172 meshingly engage each other. A third gear 173 is located within the cavity 160, and has a third pitch radius. The third gear is mounted concentrically on the third shaft 163 and is operable for rotational movement therewith. A fourth gear 174 is located within the cavity 160 and has a fourth pitch radius which is substantially equal to the third pitch radius. The fourth gear is mounted concentrically on the fourth shaft 164 and is operable for rotational movement therewith. As further shown in FIG. 10, the third and fourth gears 173 and 174 meshingly engage each other. A fifth gear 175 is located within the cavity 160 and has a fifth pitch radius which is substantially equal to one-half the second pitch radius. The fifth gear is mounted concentrically on the third shaft 163 and is operable for rotational movement therewith. A sixth gear 176 is located within the cavity 160 and is supported by the casing 159 for rotational movement. The sixth gear is located between the second shaft 162 and the third shaft 163. The sixth gear 176 meshingly engages the second gear 172, and the fifth gear 175. As should be understood, the sixth gear 176 is disengagable from the second and fifth gears 172 and 175 so that the amount of timing offset, as mentioned above, can be adjusted by changing the angular relationship between the first and second pairs of eccentric weights 100A and 100B.

Referring again to FIGS. 7 and 11, the eccentric weights 101, 102, 103, and 104 have specific angular positions on the shafts 161, 162, 163, and 164, respectively. As shown in FIG. 7, the first eccentric weight 101 is at a first angular position when the first center of mass 121 is located between, and is substantially coplanar with, the first and second shafts 161, 162. As further indicated in FIG. 7, the second eccentric weight 102 is at a second angular position when the second center of mass 122 is located between, and is substantially coplanar with, the second and third shafts 162, 163.

Now referring to FIG. 11, the third eccentric weight 103 is at a third angular position when the third center of mass is located between, and is substantially coplanar with, the third and fourth shafts 163, 164. As further shown in FIG. 11, the fourth eccentric weight 104 is at a fourth position when the fourth shaft 164 is between, and substantially coplanar with, the fourth center of mass 124 and the third shaft 163. As seen in FIG. 7, the first and second positions occur simultaneously. Similarly, as seen in FIG. 11, the third and fourth positions occur simultaneously.

However, as indicated by an examination of both FIG. 7 and FIG. 11, the first and second positions do not occur simultaneously with the third and fourth positions because of the timing offset feature mentioned above. In other words, when the first and second eccentric weights 101, 102 are at the first and second positions, respectively as shown in FIG. 7, the third eccentric weight 103 is angularly located about twenty (20) to about sixty (60) degrees out of the plane defined by the shafts 161–164 from the third position. Likewise, when the first and second eccentric weights 101, 102 are at the first and second positions, respectively as shown in FIG. 7, the fourth eccentric weight 104 is angularly located about twenty (20) to about sixty (60) degrees out of the plane defined by the shafts 161–164, or out of rotation from the fourth position (This is in the opposite direction).

This twenty to sixty degrees of rotation of the third and fourth weights is substantially equivalent to about 1/36 to about 1/12 of the rotation of the first and second weights 101, 102, or 1/36 to about 1/12 of the period of the first force 130 as earlier discussed. This may be seen by an examination of FIG. 11, where the first and second eccentric weights 101, 102 are angularly displaced from the first and second positions when the third and fourth eccentric weights 103, 104 are at the third and fourth positions, respectively. This angular displacement of the first and second weights 101 and 102 when the third and fourth 103 and 104 weights are at the third and fourth positions, respectively, is about one-half the angular displacement of the third and fourth weights 103 and 104 when the first and second weights 101 and 102 are at the first and second positions respectively. The reason for this is that the first and second weights 101 and 102 are mechanically arranged to turn at about one-half the angular velocity of the third and fourth weights 103 and 104.

OPERATION

The operation of the described embodiments of the present invention are believed to be readily apparent and are briefly summarized at this point.

As earlier discussed, the vibratory conveyor apparatus of the subject invention comprises a conveyor bed 30 defining a channel 34 for supporting the product 39 for movement along the given path of travel 35; support members 20 for supporting the conveyor bed 30 from an overhead structure 11 and which allows the conveyor bed 30 to reciprocate; and a drive assembly generally indicated by the numeral 40 in a first form of the invention and by the numeral 100 in a second form, and which is borne by the conveyor bed 30 and which imparts a reciprocal vibratory motion to same, and wherein, during the reciprocal vibratory motion, the conveyor bed 30 has a given velocity in a first as direction 41 and a given velocity in a second direction 42, and wherein the velocity of the conveyor bed 30 in the first direction 41 is greater than the velocity of the conveyor bed 30 in the second direction 42.

In one form of the present invention the drive assembly generally indicated by the numeral 100 and borne by the conveyor bed 30 which imparts reciprocal vibratory motion to the same, has first and second pairs of rotatable eccentric weights which are indicated by the numerals 100A and 100B. The first pair of rotatable eccentric weights 100A of the vibratory drive 100 individually have similar ERWT values and counter-rotate, one with the other, at a given speed to produce a first reciprocal sinusoidal force 130 which is characterized by a first period 132. The second pair of rotatable eccentric weights 100B of the vibratory drive 100 also individually have similar ERWT values and counter-rotate, one with the other, at substantially twice the given speed to produce a second reciprocal sinusoidal force 133 which is characterized by a second period 135.

The first pair of rotatable eccentric weights 100A includes a first eccentric weight 101 having a first ERWT value. The first eccentric weight 101 is supported by the vibratory drive 100 for rotational movement about a first axis of rotation 111. The first axis of rotation 111 is substantially transverse to the given path of travel 35. The first eccentric weight 101 produces a first centrifugal force relative to the first axis of rotation 111 when rotated. The first pair of rotatable eccentric weights also includes a second eccentric weight 102 having a second ERWT value substantially equal to the first ERWT value. The second eccentric weight 102 is supported by the vibratory drive 100 for rotational movement about a second axis of rotation 112. The second axis of rotation 112 is substantially parallel to the first axis of rotation 111. The second eccentric weight 102 produces a second centrifugal force relative to the second axis of rotation 112 when rotated.

The second pair of rotatable eccentric weights 100B includes a third eccentric weight 103 which is supported by the vibratory drive 100 for rotational movement about a third axis of rotation 113. The third axis of rotation 113 is substantially transverse to the given path of travel 35. The third eccentric weight 103 produces a third centrifugal force relative to the third axis of rotation 113 when rotated. The second pair of rotatable eccentric weights 100B also includes a fourth eccentric weight 104 having a fourth ERWT value which is substantially equal to the third ERWT value. The fourth eccentric weight 104 is supported by the vibratory drive 100 for rotational movement about a fourth axis of rotation 114. The fourth axis of rotation 114 is substantially parallel to the third axis of rotation 113. The fourth eccentric weight 104 produces a fourth centrifugal force relative to the fourth axis of rotation 114 when rotated.

The drive assembly 100 acts as a rotational synchronizing assembly which is coupled to the first, second, third, and fourth eccentric weights 101, 102, 103, and 104, respectively. The drive assembly 100 causes the first and second eccentric weights 101 and 102 to counter-rotate at substantially the same angular velocity and to combine to produce a first sinusoidal force 130 which is characterized by a first period 132. The first sinusoidal force 130 alternates between a first direction 41 and a second direction 42 opposite to the first direction. The first and second directions 41 and 42, respectively, are substantially parallel to the given path of travel 35. The drive assembly 100 also causes the third and fourth eccentric weights 103 and 104 respectively to counter-rotate at substantially the same angular velocity which is substantially twice the angular velocity of the first and second eccentric weights 101 and 102, respectively. The third and fourth centrifugal forces produced by the third and fourth rotating eccentric weights 103 and 104, respectively, combine to produce a second sinusoidal force 133. The second sinusoidal force 133 is characterized by a second period 135. The second sinusoidal force 133 also alternates between the first direction 41 and the second direction 42.

The vibratory drive 100 includes a gearbox casing 159 which defines a sealable cavity 160. The vibratory drive 100 also includes a first shaft 161 positioned substantially transverse relative to the given path of travel 35 and which is supported by the casing 159 for rotational movement. The drive assembly 100 also includes a first gear 171 located within the cavity 160 which has a first pitch radius. The first gear 171 is mounted concentrically on the first shaft 161 and is operable for rotational movement therewith.

Also included in the drive assembly 100 is a second shaft 162 which is substantially parallel to the first shaft 161 and which is also supported by the casing 169 for rotational movement. A plane is defined by the first and second shafts 161 and 162 and which is substantially parallel to the given path of travel 35. A second gear 172 is located within the cavity 160 and has a second pitch radius which is substantially equal to the first pitch radius. The second gear 172 is mounted concentrically on the second shaft 162 and is operable for rotational movement therewith. The first and second gears 171 and 172 meshingly engage each other within the cavity 160.

A third shaft 163 is rotatably mounted in the casing 159 and is positioned in parallel spaced relationship to the first and second shafts 161 and 162. The third shaft 163 is also substantially coplanar with the first and second shafts 161 and 162 wherein the second shaft 162 is located between the first shaft 161 and the third shaft 163. A third gear 173 is located within the cavity 160 and has a third pitch radius. The third gear 173 is mounted concentrically on the third shaft 163 and is operable for rotational movement therewith.

A fourth shaft 164 is rotatably mounted in the casing 159 and positioned in parallel spaced relationship to the first, second and third shafts 161, 162 and 163, respectively. The fourth shaft 164 is also substantially coplanar with the first, second and third shafts 161, 162 and 163, and wherein the third shaft 163 is located between the second shaft 162 and the fourth shaft 164. A fourth gear 174 is located within the cavity 159 and has a fourth pitch radius which is substantially equal to the third pitch radius. The fourth gear 174 is mounted concentrically on the fourth shaft 164 and is operable for rotational movement therewith. The third and fourth gears 173 and 174, respectively, meshingly engage each other within the cavity 160.

A fifth gear 175 is located within the cavity and has a fifth pitch radius which is substantially equal to one-half the second pitch radius. The fifth gear 175 is mounted concentrically on the third shaft 163 and is operable for rotational movement therewith. A sixth gear 176 is also located within the cavity 160 and is supported by the casing 159 for rotational movement. The sixth gear 176 lies between the second shaft 162 and the third shaft 163 such that the sixth gear 176 meshingly engages the second gear 172 and the fifth gear 175. A motor 166 is mounted to the conveyor bed 30, and is connected to the fourth shaft for rotational force transmission therebetween.

Outside the casing, the first eccentric weight 101, having a first given mass, a first center of mass 121 and a first ERWT value, is mounted on the first shaft 161 and is operable for rotational movement therewith. As mentioned above, the first eccentric weight 101 produces a first centrifugal force relative to the first shaft 161 when rotated. The first eccentric weight 101 is at a first angular position when the first center of mass 121 is located between, and is substantially coplanar with, the first and second shafts 161 and 162.

The second eccentric weight 102, having a second given mass, a second center of mass 122, and a second ERWT value, is mounted on the second shaft 162 and is operable for rotational movement therewith. The second eccentric weight 102 produces a second centrifugal force about the second shaft 162 when rotated. The second eccentric weight 102 is at a second angular position when the second center of mass 122 is located between, and is substantially coplanar with, the second and third shafts 162 and 163.

The third eccentric weight 103, having a third given mass, a third center of mass 123, and a third ERWT value, is mounted on the third shaft 163 and is operable for rotational movement therewith. The third eccentric weight 103 produces a third centrifugal force about the third shaft 163 when rotated, and is at a third angular position when the third center of mass 123 is located between, and is substantially coplanar with, the third and fourth shafts 163 and 164. When the first and second eccentric weights 101 and 102, respectively, are at the first and second positions, respectively, as discussed above, then the third eccentric weight 103 is angularly located about twenty (20) to about sixty (60) degrees from the third position as discussed above.

The fourth eccentric weight 104, having a fourth given mass, a fourth center of mass 124, and a fourth ERWT value, is mounted on the fourth shaft 164 and is operable for rotational movement therewith. The fourth eccentric weight 104 produces a fourth centrifugal force about the fourth shaft 164 when rotated. The fourth eccentric weight 104 is at a fourth angular position when the fourth shaft 164 is between, and is substantially coplanar with, the fourth center of mass 124 and the third shaft 163. When the first and second eccentric weights 101 and 102 are at the first and second positions, respectively, as discussed above, then the fourth eccentric weight 104 is angularly located about twenty (20) to about sixty (60) degrees from the fourth position, as discussed above.

As discussed above, the first and second centrifugal forces produced by the first and second rotatable eccentric weights 101 and 102 combine to produce a first force 130 which is substantially sinusoidal and which is characterized by a first period 132. The first force 130 alternates between a first direction 41 and a second direction 42, opposite the first direction. The first and second directions 41 and 42 are substantially parallel to the given path of travel 35. The first direction 41 is in the direction of the intake end 36 of the conveyor apparatus.

Likewise, the third and fourth centrifugal forces combine to produce a second force 133 which is substantially sinusoidal and which is characterized by a second period 135 which is substantially ½ the first period 132. The second force 133 also alternates between the first and second directions 41 and 42, respectively. The combination of the first and second sinusoidal forces 130 and 133, respectively, acting on the conveyor bed 30 cause the conveyor bed 30 to reciprocate between the first and second directions 41 and 42, such that the velocity of the conveyor bed 30 in the first direction 41 is greater than the velocity of the conveyor bed 30 in the second direction 42. This relative difference in the velocities of the conveyor bed 30 in each direction 41 and 42 causes movement of the product 39 along the given path of travel 35 from the intake end 36 to the exhaust end 37 of the conveyor bed 30.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A vibratory conveyor apparatus for moving a product along a given path of travel comprising:
   a conveyor bed defining a channel for supporting the product along the given path of travel, and wherein the conveyor bed has a top and bottom surface, and wherein the top surface supports the product;
   a supporting frame mounted on the conveyor bed and which allows the conveyor bed to reciprocate; and
   a vibratory drive mounted on the conveyor bed for imparting reciprocal vibratory motion to same, the vibratory drive further comprising:
   a gearbox casing defining a sealable cavity, and which is mounted on the bed;
   a first shaft positioned substantially transverse relative to the given path of travel and supported by the casing for rotational movement;
   a first gear located within the cavity and having a first pitch radius, and wherein the first gear is mounted concentrically on the first shaft and is operable for rotational movement therewith;
   a second shaft substantially parallel to the first shaft and supported by the casing for rotational movement, and wherein a plane defined by the first and second shafts is substantially parallel to the given path;
   a second gear located within the cavity and having a second pitch radius which is substantially equal to the first pitch radius, and wherein the second gear is mounted concentrically on the second shaft and is operable for rotational movement therewith, and wherein the first and second gears meshingly engage each other;
   a third shaft rotatably mounted in the casing and positioned in substantially parallel spaced relationship to and substantially coplanar with the first and second shafts, and wherein the second shaft is located between the first shaft and the third shaft;
   a third gear located within the cavity and having a third pitch radius, and wherein the third gear is mounted concentrically on the third shaft and is operable for rotational movement therewith;
   a fourth shaft rotatably mounted in the casing and positioned in substantially parallel spaced relationship to and substantially coplanar with the first, second, and third shafts, and wherein the third shaft lies between the second shaft and the fourth shaft;
   a fourth gear located within the cavity and having a fourth pitch radius which is substantially equal to the third pitch radius, and wherein the fourth gear is mounted concentrically on the fourth shaft and is operable for rotational movement therewith, and wherein the third and fourth gears meshingly engage each other;
   a fifth gear within the cavity and having a fifth pitch radius which is substantially equal to one-half the second pitch radius, and wherein the fifth gear is mounted concentrically on the third shaft and is operable for rotational movement therewith;
   a sixth gear located within the cavity and supported by the casing for rotational movement, and wherein the sixth gear lies between the second shaft and the third shaft, and wherein the sixth gear meshingly engages the second gear and the fifth gear;
   a first eccentric weight having a first given mass, a first center of mass, and a first ERWT value, and wherein the first eccentric weight is mounted on the first shaft and is operable for rotational movement therewith, and wherein the first eccentric weight produces a first centrifugal force relative to the first shaft when rotated, and wherein the first eccentric weight is at a first angular position when the first center of mass is located between, and is substantially coplanar with, the first and second shafts;
   a second eccentric weight having a second given mass, a second center of mass, and a second ERWT value, and wherein the second eccentric weight is mounted on the second shaft and is operable for rotational movement therewith, and wherein the second eccentric weight produces a second centrifugal force about the second shaft when rotated, and wherein the second eccentric weight is at a second angular position when the second center of mass is located between, and is substantially coplanar with, the second and third shafts;
   a third eccentric weight having a third given mass, a third center of mass, and a third ERWT value, and wherein the third eccentric weight is mounted on the third shaft and is operable for rotational movement therewith, and wherein the third eccentric weight produces a third centrifugal force about the third shaft when rotated, and wherein the third eccentric weight is at a third angular position when the third center of mass is located between, and is substantially coplanar with, the third and fourth shafts, and wherein, when the first and second eccentric weights are at the first and second positions, respectively, the third eccentric weight is angularly located about 20 to about 60 degrees from the third position; and
   a fourth eccentric weight having a fourth given mass, a fourth center of mass, and a fourth ERWT value, and wherein the fourth eccentric weight is mounted on the fourth shaft and is operable for rotational movement therewith, and wherein the fourth eccentric weight produces a fourth centrifugal force about the fourth shaft when rotated, and wherein the fourth eccentric weight is at a fourth angular position when the fourth shaft is between, and is substantially coplanar with, the fourth center of mass and the third shaft, and wherein, when the first and second eccentric weights are at the first and second positions, respectively, the fourth eccentric weight is angularly located about 20 to about 60 degrees from the fourth position.

2. A vibratory conveyor apparatus as claimed in claim 1, wherein the first and second ERWT values are substantially equal to each other, and wherein the third and fourth ERWT values are substantially equal to each other, and wherein the first ERWT value is about 4 to about 16 times greater than the third ERWT value.

3. A vibratory conveyor apparatus as claimed in claim 2, wherein the sixth gear is disengagable from the second and fifth gears.

4. A vibratory conveyor apparatus as claimed in claim 3, wherein the conveyor has an intake end and an exhaust end, and wherein the intake end is located nearest to the fourth shaft and the exhaust end is located nearest to the first shaft.

5. A vibratory conveyor apparatus as claimed in claim 4, wherein the first and second centrifugal forces combine to produce a first force which is substantially sinusoidal and which is characterized by a first frequency and period, and wherein the first force alternates between a first direction and a second direction opposite the first direction, and wherein the first and second directions are substantially parallel to the given path, and wherein the first direction is in the direction of the intake end, and wherein the third and fourth centrifugal forces combine to produce a second force which is substantially sinusoidal and which is characterized by a second frequency, which is substantially twice the first frequency, and a second period which is substantially one-half the first period, and wherein the second force alternates between the first and second directions.

6. A vibratory conveyor apparatus as claimed in claim 5, wherein a maximum value of the first force in the first direction occurs at the beginning of a given time interval, and a maximum of the second force occurs at the end of the given time interval, and wherein the time interval is adjustable from about $1/36$ to about $1/12$ of the given period of the first linear force.

7. A vibratory conveyor apparatus as claimed in claim 6, wherein a motor is coupled to the first, second, third, or fourth shaft for rotational force transmission therebetween.

* * * * *